Patented June 24, 1930

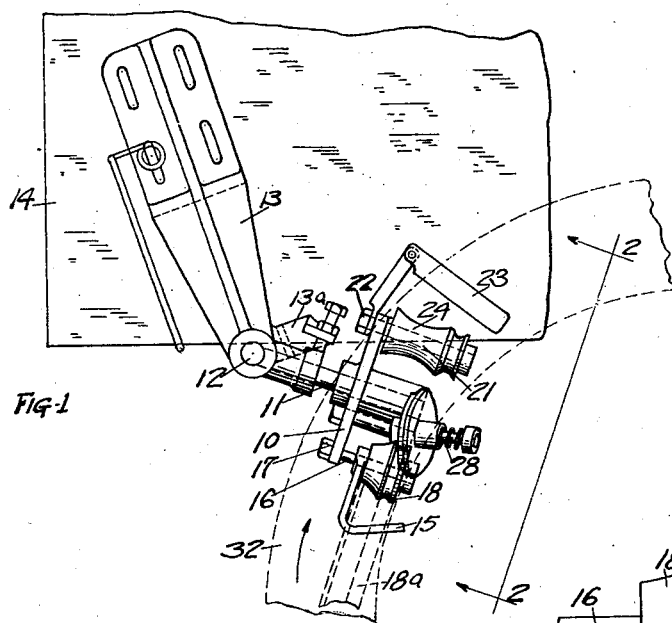

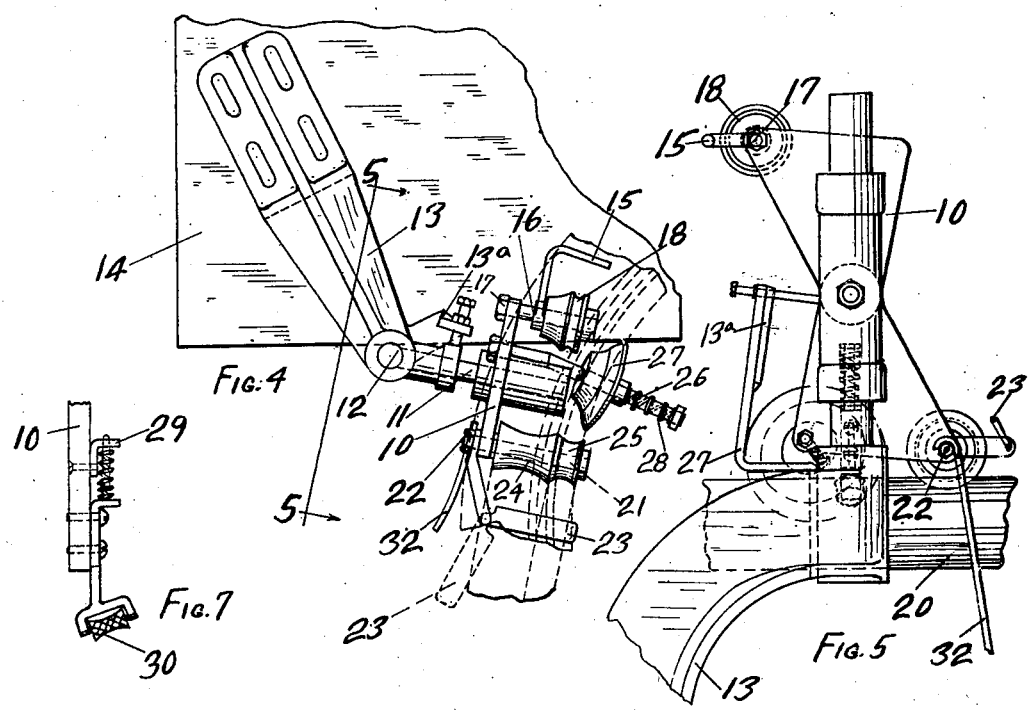

1,768,340

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

STRIP-APPLYING DEVICE

Application filed November 6, 1926. Serial No. 146,698.

This invention relates to machines for making tires and especially to devices for applying beads, side wall and chafer strips to pneumatic tire casings.

It is the purpose of this invention to provide an improved bead, side wall and chafer strip applying device on a known type of tire building machine, comprising a driven core rotatable in a vertical plane and in a horizontal plane whereby the tread or either of the side walls may be positioned uppermost. The chief object of the invention is to provide suitable guides and rollers mounted on a single pivoted bracket, whereby the bead strip may be guided, applied and rolled onto the tire casing or carcass, the bracket swung to another position, and the side wall and chafer strip guided, applied and rolled onto the carcass. Another object is to provide a separate roller for each edge and for the intermediate portion of the side wall and chafer strip whereby each portion of said strip may be effectively applied and rolled into position on the tire carcass. By providing means for performing these operations, a complete tire casing may be built on the one machine.

Other more specific objects will appear from the following detailed description in connection with the accompanying drawings in which the invention is illustrated in its preferred form, it being understood that it is not limited to the specific device illustrated.

Of the accompanying drawings:

Figure 1 is a plan view of a device embodying my invention, the bead applying guides and rollers being in operative position;

Figure 2 is an elevation thereof as viewed in the direction indicated by arrows 2—2;

Figure 3 is an enlarged detail partly in section illustrating the bead roller applying a bead strip onto a casing;

Figure 4 is a plan view illustrating the side wall and chafer strip rollers in operative position;

Figure 5 is an enlarged elevation thereof; as viewed in the direction indicated by arrows 5—5;

Figure 6 is a further enlarged detail, partly in section, illustrating the last-named rollers applying a side wall and chafer strip;

Figure 7 is a detail elevation of a side wall margin roller; and

Figure 8 is an elevation of a portion of a tire building machine illustrating the relative position of my strip applying device.

Referring more particularly to the drawings, 10 is a bracket pivoted on horizontal stud shaft 11 so as to be swung in a vertical plane. Shaft 11 is pivotally mounted on a vertical shaft 12 carried by supporting arm 13, attached to the frame 14 of the tire building machine. Thus shaft 11 with pivoted bracket 10 may also be swung in a horizontal plane. This horizontal movement is limited by an adjustable stop member 13$^a$ mounted on arm 13.

One side of bracket 10 carries a bead strip applying means comprising a guiding arm 15 fixed upon a stud shaft 16 passing through said bracket, and secured thereto by a nut 17. A roller 18, shaped to conform to the contour of the bead strip 18$^a$, is rotatably mounted on shaft 16 and is adapted to overlie the inner periphery of a tire casing 19 applied around a rotatable collapsible core 20 for applying a bead strip to said casing. The bracket 10 is also provided with an adjustable screw 10$^a$ for limiting its movement in a vertical plane when bead roller 18 is in operative position.

The other end of the bracket 10 carries a side wall and chafer strip applying means comprising a stud shaft 21 passing through one corner of said bracket, and secured thereto by a nut 22. Between said nut and bracket 10 is clamped a hinged guiding arm 23 which may be swung in any desired position for properly guiding the side wall and chafer strip. Roller members are rotatably mounted on shaft 21 and comprise a concave-faced roller 24 for rolling the intermediate portion of the side wall strip 24$^a$ and an outer roller 25 shaped to conform to the contour of the bead for rolling the chafer strip 25$^a$ over the bead of the tire. Stud shaft 26, having a portion bent toward shaft 21 and slightly downward, is attached to the other corner of the same end of bracket 10 and carries a roller 27 adapted to roll or stitch down the extreme inner margin of the chafer strip where it passes over the inner side of the bead. A spring 28 is interposed between roller 27 and its shaft end to provide a proper lateral pressure to said roller and allow for irregularities in the tire building materials. Due to the angular bend in shaft 26, bracket 10 may be adjusted so that both roller 24 and roller 27 may rotate about axes radially of the core 20 and roller 27 may engage under the overhang of the bead. Intermediately of shafts 21 and 26, a bracket 29 carries a spring pressed roller 30 for rolling down the outer edge of the side wall strip where it overlaps the tread band 31.

A rod 32 is connected by a spring 33 to any suitable anchoring means, shown in Figure 8 as a clamp 34 attached to the operating pedal 35 of the tire building machine. Rod 32 is formed at its upper end with a hook portion 36 to engage over either of nuts 17 or 22, and provides the proper pressure on rollers 18 or 24, respectively.

The tire building machine in connection with which the invention is used is a known type and comprises a universal core-carrying head 37 rotatably mounted in journal 38 carried by the frame 14. A dog 39 is engageable in any of slots 40 to hold the head so that the core 20 may be vertically positioned or may be held with either of its sides uppermost. A suitable driving mechanism, not completely shown, is provided for driving the core at various speeds in either direction for applying the tire building strips. A supporting arm 41 is mounted on journal 34 and carries a pivotally attached lever 42 upon which are journaled fabric stitchers 43 and a tread roller 44, said lever being counterbalanced by a weight 45.

In operation, after two bands of casing fabric have been stitched over the core 20 in its vertical position, the core carrying head 37 is rotated through a quarter-turn so that the core is in a horizontal position. The bead strip 18a is then drawn from a reel (not shown) and the end affixed to the casing in proper position. Bracket 10 is swung into position with bead roller 18 lowermost and engaging the bead strip as shown in Figures 1, 2 and 3. Hook 36 is engaged over nut 17 to provide the proper pressure on the roller. The strip is guided over bar 15 and rolled into place as the core is slowly rotated in a clockwise direction, as shown in Figure 1. When nearly a complete revolution of the core is made, the core is stopped and the strip is cut to proper length, usually so as to provide a slight bevelled overlap, the core being again slowly rotated to roll the end of the strip in place.

The bead on the other side of the casing is applied in a similar manner, the core-carrying head being unlatched, rotated through a half-turn and latched again by means of dog 39, to bring the core to a horizontal position and the other side of the casing uppermost, bracket 10 first having been swung out of the way to permit such rotation. So that the core will again be rotated clockwise with respect to bracket 10, its rotation is reversed by a proper manipulation of the driving mechanism controls.

The core is next adjusted to its vertical position and two more bands of casing fabric applied and stitched down over the aforementioned bands, and over the bead strips by means of stitchers 43 as will be understood. Tread band 31 is next applied and rolled into place by roller 44.

The casing is then ready for the composite side wall and chafer strip which is applied in a similar manner to the bead strip, the core being rotated first with one side uppermost and then with the other. Bracket 10 is swung into position and swung about shaft 11 a half-turn so that rollers 24, 25, 27 and 30 are lowermost and in the position shown in Figures 4, 5, 6, 7 and 8, hook 36 being engaged over nut 22. The strip is guided over arm 23 and its intermediate portion 24a rolled down onto the casing by roller 24. The outer edge of the side wall overlaps the tread band 31 and is rolled down by roller 30. The chafer strip portion 25a is rolled down over the bead by roller 25 and its edge stitched against the inner side of the bead by roller 27. All of these rolling operations are successively performed in a single revolution of the core. The strip is finished off in the same manner as the bead strip and the other side wall and chafer applied in a similar manner as mentioned above. Thus, all of the tire building operations are performed on the one machine and the completed tire casing is ready for removal by collapsing core 20.

Modification of my invention may be resorted to without departing from the spirit or scope thereof as claimed in the appended claims.

What I claim is:

1. A tire-making machine comprising, in combination, a rotatable core adapted to be supported in reversed horizontal positions, and a strip applying device movable onto a side of the core in either horizontal position thereof for operation successively on both sides of a tire built on said core.

2. A tire-making machine comprising, in combination, a rotatable core adapted to be supported in reversed horizontal positions, and a tire-shaping device movable onto a side of the core in either horizontal position thereof, said device comprising a plurality of strip appliers and being pivoted for bringing selectively into cooperation with said core any one of said strip appliers.

3. In a tire-making machine, the combination of a rotatable core, a revolvable core-carrying head adapted to support said core in reversed horizontal positions, and a tire-shaping device shiftable over a side of the core in either horizontal position thereof, said device comprising a plurality of strip appliers and being pivoted for bringing said appliers successively into cooperation with said rotatable core.

WILLIAM C. STEVENS.